United States Patent [19]

Kaus

[11] Patent Number: 4,644,934
[45] Date of Patent: Feb. 24, 1987

[54] SOLAR ENERGY HEATING SYSTEM

[76] Inventor: David P. Kaus, 10140 Pleasant Ave., South, Bloomington, Minn. 55420

[21] Appl. No.: 730,470

[22] Filed: May 3, 1985

[51] Int. Cl.⁴ .............................................. F24J 2/30
[52] U.S. Cl. ................................. 126/435; 126/437; 126/438; 165/101; 165/155
[58] Field of Search ............... 126/435, 437, 438, 442, 126/443; 165/155, 101

[56] References Cited

U.S. PATENT DOCUMENTS

| | | | |
|---|---|---|---|
| 1,960,325 | 5/1934 | Wadley | 165/155 |
| 2,163,591 | 6/1939 | Deverall | 165/101 X |
| 2,205,378 | 6/1940 | Abbot | 126/438 X |
| 2,218,097 | 10/1940 | Rhodes | 165/155 |
| 2,576,309 | 11/1951 | Ruemelin | 165/155 X |
| 3,954,097 | 5/1976 | Wilson, Jr. | 126/438 |
| 4,048,983 | 9/1977 | Pel | 126/438 |
| 4,257,479 | 3/1981 | Newton | 165/156 |
| 4,326,499 | 4/1982 | Koskela | 126/420 |
| 4,343,538 | 8/1982 | Currin et al. | 350/288 |
| 4,505,262 | 3/1985 | Eaton | 126/435 |

Primary Examiner—Samuel Scott
Assistant Examiner—Allen J. Flanigan
Attorney, Agent, or Firm—Burd, Bartz & Gutenkauf

[57] ABSTRACT

A solar energy system for heating water. The system comprises a solar collector, a heat exchanger, and hot water storage tank along with necessary interconnecting conduits, circulating pump and controls. The system is characterized by a double-walled fluid heating conduit within the solar collector and by a triple-walled heat exchanger housing enclosing three concentric liquid passageways. Liquid heated by the solar collector is circulated through the outermost and innermost heat exchanger passages while water to be heated is circulated in countercurrent flow through an intermediate passageway sandwiched between the other passageways.

11 Claims, 6 Drawing Figures

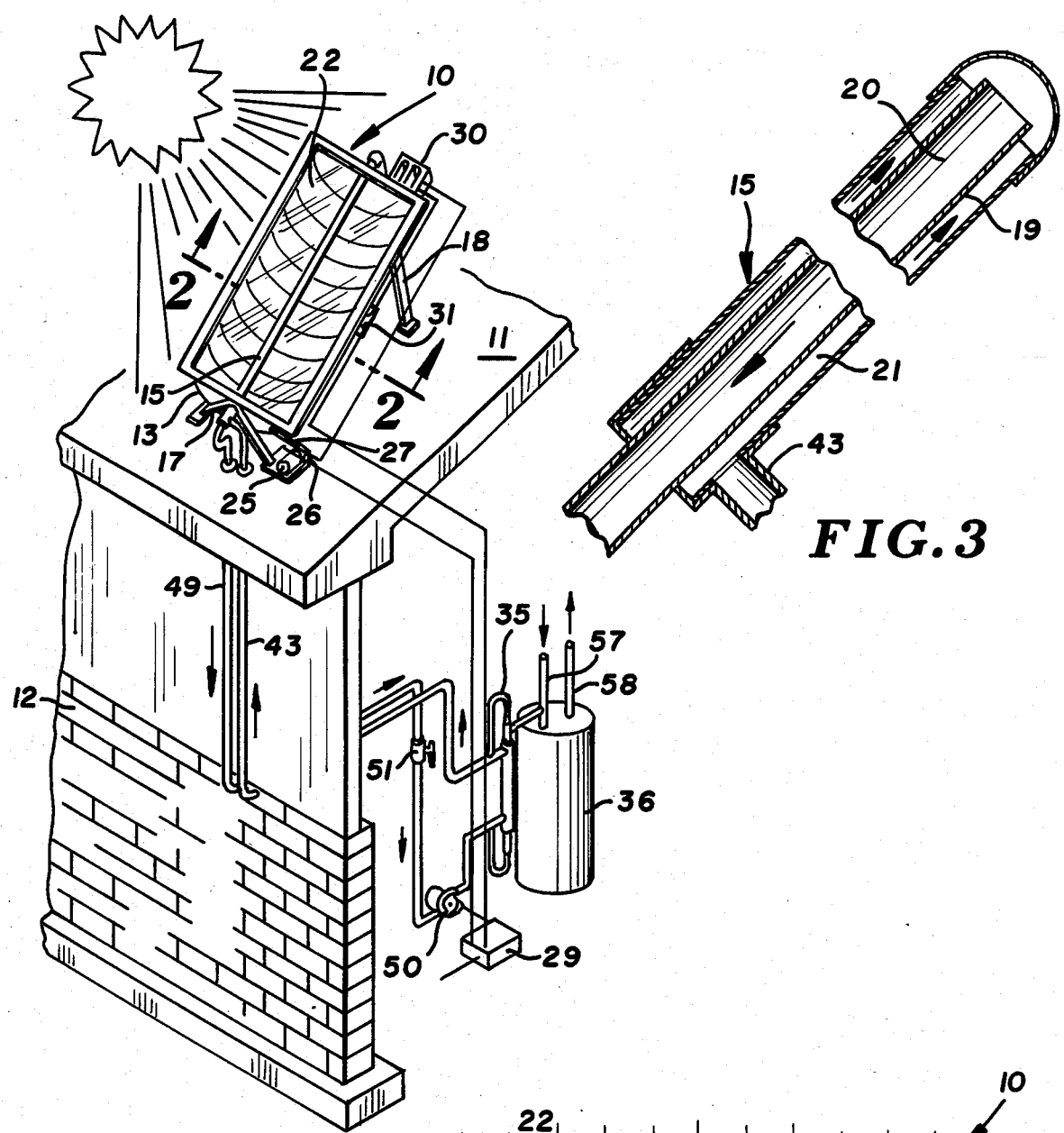
FIG.1
FIG.3
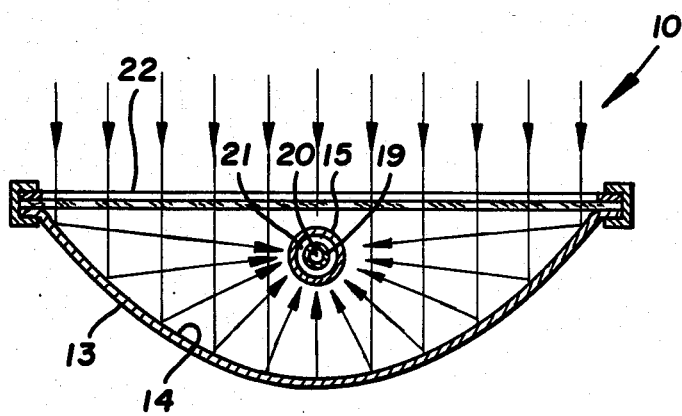
FIG.2

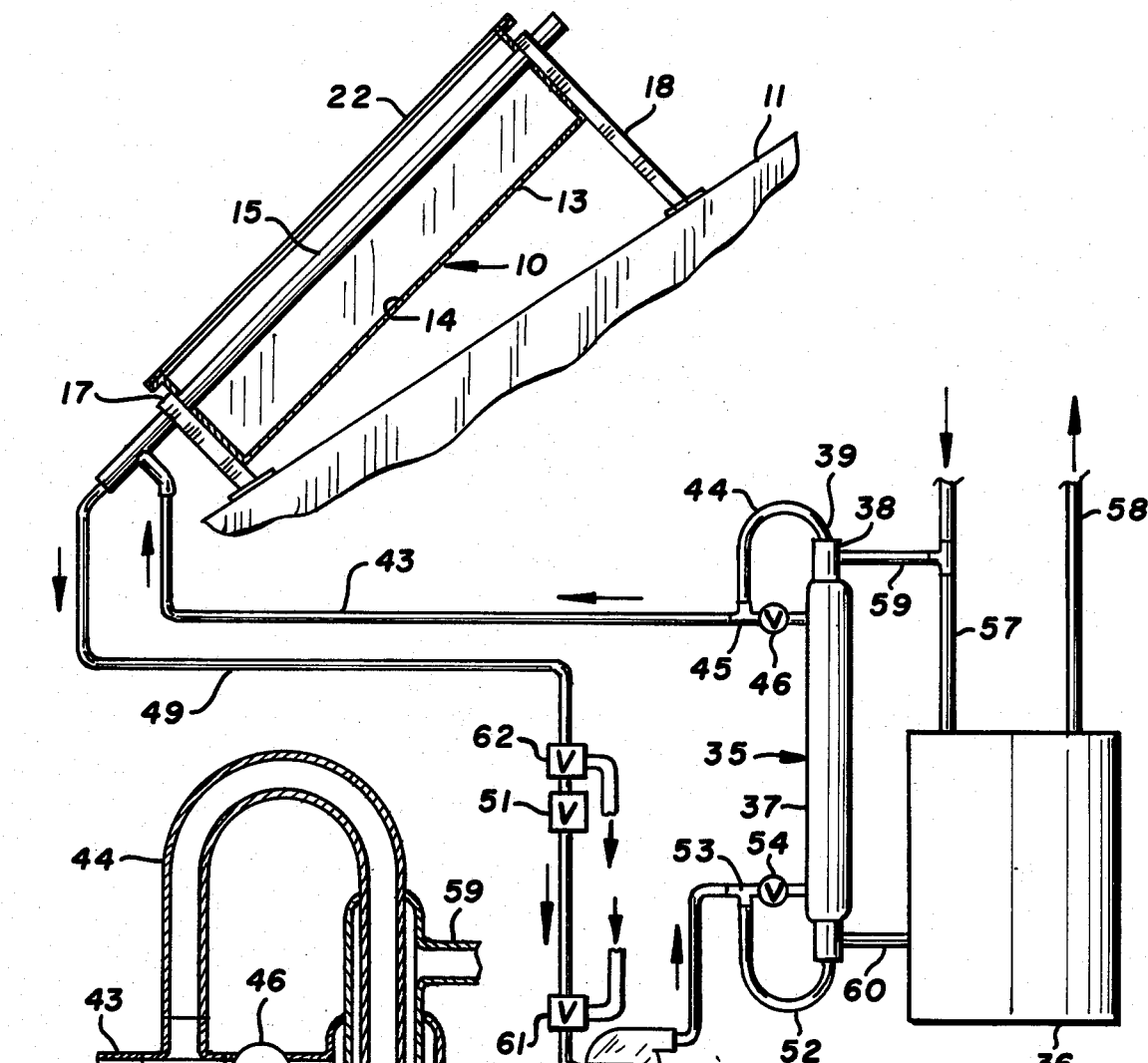
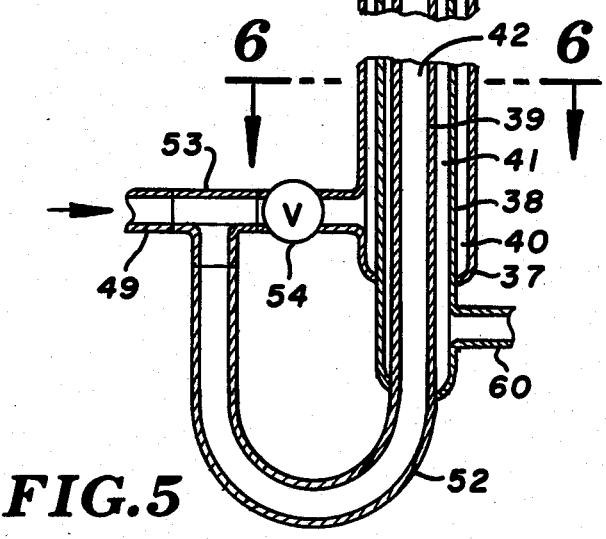
FIG.5
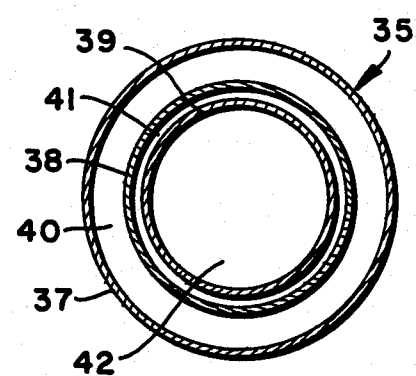
FIG.6
FIG.4

SOLAR ENERGY HEATING SYSTEM

FIELD OF THE INVENTION

BACKGROUND OF THE INVENTION

This invention is directed to a solar energy heating system intended for use primarily for the indirect heating of water for domestic, agricultural or commercial use, including space heating, swimming pools, hot tubs, and similar hot water uses.

SUMMARY OF THE INVENTION

In its broadest sense, the heating system of the present invention comprises at least one solar collector, a heat exchanger, and a hot water storage tank with associated interconnecting conduits and circulation and flow control means.

The collector comprises an elongated concave lightweight rotatable parabolic solar ray concentrating unit having an elongated double-walled liquid conduit within that unit located generally along the axis of rotation thereof. The concentrating unit is provided with a high efficiency reflective surface on its interior wall and with a protective transparent cover. A tracking mechanism is provided for rotating the concentrating unit in correlation with the relative movement between the collector and the sun.

The heat exchanger comprises a triple-walled housing having a plurality of three elongated concentric liquid passageways. The innermost and outermost passageways are connected to the liquid conduit of the collector to receive and circulate the heated liquid from the collector. The intermediate passageway of the heat exchanger is connected to receive cold water for domestic use and circulate it in countercurrent flow between the innermost and outermost passageways to absorb the heat from the solar heated liquid circulating therein. The resulting heated water is circulated to a tank for storage.

BRIEF DESCRIPTION OF THE DRAWINGS

The invention is illustrated by the accompanying drawings in which corresponding parts are identified by the same numerals and in which:

FIG. 1 is a fragmentary and schematic perspective view showing the components of one form of the solar energy system, according to the present invention;

FIG. 2 is a transverse section through the solar collector and concentrating unit on the line 2—2 of FIG. 1 and in the direction of the arrows;

FIG. 3 is a longitudinal section through the liquid conduit of the collector and concentrating unit;

FIG. 4 is a side elevation showing schematically one form of general arrangement of the components of the system;

FIG. 5 is a vertical section showing details of construction of the heat exchanger unit; and FIG. 6 is a transverse section on the line 5—5 of FIG. 4.

DETAILED DESCRIPTION OF THE DRAWINGS

Referring now to the drawings, the heating system is shown as comprising a solar collector, indicated generally at 10, mounted on the roof 11 of a building 12 housing the heat exchanger and storage tank and other components of the system. Depending on need, a bank of two or more interconnecting collectors may be used. Depending on site conditions, the collectors may be located on the ground, on sides of buildings, etc. Depending upon the latitude of the installation, and the degree of insulation, the heat exchanger, storage tank, etc., need not be enclosed.

The collector includes an elongated closed end concave solar ray parabolic concentrating unit or reflector housing 13. Housing 13 is preferably formed from some durable lightweight material, such as molded rigid fiber glass reinforced polyester, epoxy, or other equivalent synthetic resin. Its interior surfaces are provided with a reflectorized coating 14, preferably applied as a laminated film layer. One exemplary material is the metalized flexible acrylic film having a pressure-sensitive adhesive backing which is sold by the 3M Company under the proprietary name ECP-244.

A receptor tube in the form of an elongated double-walled liquid conduit 15 extends the length of the reflector housing 13 and beyond the end walls thereof. The ends of conduit 15 are supported in a pair of A-frame legs or brackets 17 and 18, respectively. The collector 10 is mounted on the south side of a building 12 (in the Northern Hemisphere) and the length of the leg supports 17 and 18 is dependent upon the slope of roof 11 so as to position the collector for optimum exposure to the sun's rays. Conduit 15 thus lies along the axis of rotation of the reflector housing 13 and at the focal point of sun rays reflected by the reflectorized coating 14.

As seen in FIGS. 2 and 3, conduit 15 includes an inner concentric tube or pipe 19. The conduit 15 thus encloses an inner passageway 20 within tube 19 which communicates at its uppermost end with concentric annular outermost passage 21. Passageway 21 has an inlet port and passageway 20 has a discharge port at the lowermost end of conduit 15. Thus there is countercurrent flow between the liquid circulated in through the passage 21 and out through inner passage 20. The outer surface of conduit 15 is desirably provided with a dark mattefinish heat-absorbing coating.

A cover plate 22 of glass or synthetic resinous plastic sheet material, which is transparent to the passage of the sun's rays, overlies the open top of the reflector housing 13 to protect the reflectorized surface 14 against damage and the accumulation of leaves, dust, and other debris. A preferred material is TEDLAR 400SE polyvinyl fluoride film sold by the du Pont Company.

The reflector housing is journaled for limited rotation about the axis of conduit 15 by electric motor 25 through gear box 26 of appropriate reduction, driving cam actuated lever arm 27, or, preferably through a thread ball drive actuator (Acme or Saginaw HiTech) whose output shaft is linked to the reflector housing. The motor 25 is actuated in response to control box 29, which is connected to sun tracker unit 30 and heat sensor 31, the latter both mounted on the reflector housing, the motor, control box and sensing units being interconnected by appropriate electrical conduits. The tracker unit includes photocells for detecting the light level of the sun. The heat sensor detects the temperature of the liquid within the receptor tube, conduit 15. When two or more collector units are used together, they are preferably mounted in a single frame and linked for rotation together.

The collector unit is thus positioned for optimum exposure to the sun's rays by limited rotation of the reflector housing corresponding to the relative movement between the sun and the collector unit dependent upon the hour of the day and the season of the year.

A heat exchanger, indicated generally at 35, is interposed between the collector 10 and hot water storage tank 36. As best seen in FIGS. 5 and 6, the heat exchanger 35 comprises a triple-walled housing composed of outermost pipe or tube conduit 37, intermediate pipe or tube conduit 38, and innermost pipe or tube conduit 39, all disposed concentrically. Conduits 37 and 38 define an outermost annular passageway 40. Conduits 38 and 39 define an intermediate annular passageway 41 and innermost conduit 39 defines an innermost passageway 42. The heat exchanger housing is desirably constructed of copper or equivalent readily heat conductive material.

One end of outermost passageway 40 of heat exchanger 35 is connected to the outermost passage 21 of collector conduit 15 by virtue of conduit 43 of appropriate pipe or tubing, comprising part of a first conduit means. The same end of innermost passageway 42 of heat exchanger 35 is connected into conduit 43 by means of conduit 44 connected into T-fitting 45 in conduit 43 and comprising part of the first conduit means. A flow equalizing valve 46, which may be a throttling valve or manually operated control valve, is interposed in conduit 43 between heat exchanger pipe 37 and T-fitting 45 to equalize the flow from passages 40 and 42 into conduit 43.

A conduit 49 in the form of appropriate pipe or tubing comprising part of a second conduit means connects the inner passage 20 of collector conduit 15 to the opposite end of the outermost passage 40 of heat exchanger 35. A pump 50, driven by an electric motor actuated by control box 29, circulates liquid between the collector and heat exchanger through conduits 49 and 43. A preferred form of pump is a Grundfos circulator sold by Grundfos Pumps Corp. of Clovis, CA. To prevent backflow, a check valve 51 is interposed in conduit 49. Conduit 49 also connects the opposite end of the innermost heat exchanger passage 42 to the collector conduit through conduit 52 connected into conduit 49 by virtue of T-fitting 53. A flow equalizing valve 54, similar to valve 46, is interposed in conduit 49 between T-fitting 53 and heat exchanger pipe 37.

Optionally, but preferably, the system includes a solenoid valve 61 in conduit 49 which is actuated in response to the temperature sensor of the receptor tube of the collector unit to introduce fresh transfer liquid from any available source into the primary heating circuit to the collector unit. Also included is a further solenoid valve 62 which is actuated in response to shut-down of the system to drain the primary heating circuit of transfer fluid.

Storage tank 36, which may be the insulated hot water storage compartment of an electrically or gas or oil fueled hot water heater, is connected through pipe 57 to a source of domestic unheated water under pressure, and through pipe 58 to a hot water distribution system. The intermediate passage 41 of heat exchanger 35 is connected at one end to water supply pipe 57 by means of conduit 59 constituting a third conduit means. The opposite end of intermediate passage 41 is connected to the storage tank 36 by means of conduit 60 constituting a fourth conduit means. Domestic water from pipe 57 to be heated passes through heat exchanger passage 41 sandwiched between passages 40 and 42 carrying liquid heated in the solar collector 10 and is heated thereby.

Where needed for added capacity, two or more storage tanks may be used. Alternatively, for some purposes, such as heating a swimming pool, no storage tank is needed but the heated water may be circulated directly to the pool.

In the preferred operation of the heating system according to the present invention, at sunrise, the photocells in the tracking sensor 30 detect a light level that is sufficient for system operation and starts the actuator motor 25. The reflector housing moves in the direction of the strongest light energy. When the photocells have determined that a "lock" on the sun has been achieved, the actuator motor stops, and sunlight is focused onto the receptor tube 15. When the receptor tube has been heated up to a pre-set operating temperature, the system's pump 50 is turned on, solenoid valve 61 is actuated and transfer fluid from an available source of liquid is pumped outdoors and up into the outer passage 21 of the receptor tube to be heated. The cool transfer fluid comes into contact with the receptor tube's temperature sensor, cooling it below the operating temperature, so the pump shuts off and the liquid is held in the receptor tube until the sun has heated it up to operating temperature. Then the pump is turned on again, bringing the heated fluid indoors and replacing it with a fresh "plug" of cool transfer fluid in the receptor tube of the collector unit.

As the operation proceeds, the primary fluid heating circuit fills and the transfer fluid continues to be circulated upstream through outer passage 21 of the collector conduit 15, becomes heated and passes in countercurrent downstream flow through passage 20 into conduit 49 to the heat exchanger 35. The stream of heated liquid is distributed between outermost heat exchanger passage 40 and innermost passage 42. Passing in countercurrent flow, the hot liquid from the collector gives up its heat to cold domestic water circulating through intermediate heat exchanger passage 41. The heated water is circulated to the storage tank 36. The heating liquid, depleted of all or part of its absorbed heat, is recirculated to the collector 10, in a closed circuit through conduit 43, for reheating.

The cycling of transfer fluid continues until the storage demand is met, the sun is obscured, or sunset occurs. When either of these conditions is detected, the system will return to an "at rest" position. Preferably the system includes a solenoid valve 62 which bypasses the check valve 51 to drain the collector unit of any transfer fluid that is still in the receptor tube. This permits the use of potable water as the transfer fluid without fear of freezing when the system is used in northern climes. This avoids the use of ethylene glycol and similar liquids having low freezing points, but which are toxic.

Dependent upon ambient conditions, the heating system may be used as a primary water heating facility, or as an auxiliary to a heating system fueled by other means. Although intended primarily for heating of a domestic water supply, dependent upon the capacity of the system, it may also be used as a space heating system by circulating the hot water through radiators, and for any of a myriad of domestic, commercial and agricultural applications requiring hot water.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A solar energy heating system comprising in combination:
   (A) at least one collector comprising:
      (1) an elongated concave lightweight rigid durable molded reinforced synthetic resinous plastic rotatable parabolic solar ray concentrating unit,
      (2) an elongated double-walled liquid heat-absorbing pipe or tub conduit within said concentrating unit extending generally along the axis of rotation thereof and defining a first outermost and immediately adjacent second innermost liquid passageway therein,
      (3) a metallized flexible pressure sensitive film laminated to form a reflective surface on the interior wall of said concentrating unit,
      (4) a protective ray-transparent cover over said concentrating unit, and
      (5) tracking mechanism for rotating said concentrating unit,
   (B) a liquid circulation and triple-walled heat exchanger sub-system connected to said collector and comprising:
      (1) a plurality of three elongated concentric liquid passageways,
      (2) a first conduit means in communication with the first end of the innermost and outermost of said heat exchanger passageways and connected to the outermost of said collector passageways, said first conduit means being bifurcated adjacent to the heat exchanger and including:
         (a) one segment in communication with the first end of the outermost heat exchanger passageway,
         (b) a flow equalizing control valve in said conduit segement, and
         (c) a second conduit segment in communication with the same end of the innermost heat exchanger passageway and connected to said first segment downstream from said valve,
      (3) a second conduit means in communication with the opposite ends of the innermost and outermost of said heat exchanger passageways and connected to the innermost of said collector passageways,
      (4) a pump in one of said first or second conduit means.
      (5) a check valve in one of said first or second conduit means between said pump and collector,
      (6) a third conduit means in communication with the first end of the intermediate heat exchanger passageway and connected to a source of cold water under pressure, and
      (7) a fourth conduit means in communication with the opposite end of the intermediate heat exchanger passageway for discharge of hot water from the heat exchanger to a hot water storage tank.

2. A system according to claim 1 wherein said concentrating unit is formed from lightweight molded glass fiber reinforced poyester or epoxy synthetic resin.

3. A system according to claim 2 wherein said reflective surface is an aluminized acrylic film laminated to the interior wall of said concentrating unit.

4. A system according to claim 1 wherein said flow equalizing valve is a throttling valve.

5. A system according to claim 1 wherein said second conduit means is bifurcated adjacent to the heat exchanger and includes:
   (A) one segment in communication with the opposite end of the outermost heat exchanger passageway,
   (B) a flow equalizing control valve in said conduit segment, and
   (C) a second conduit segment in communication with the same end of the innermost heat exchanger passageway and connected to said first segment upstream from said valve.

6. A system according to claim 6 wherein said flow equalizing valve is a throttle valve.

7. A system according to claim 1 wherein said pump and check valve are in the second of said conduit means.

8. A system according to claim 1 wherein said system includes a hot water storage tank connected to said fourth conduit means of the heat exchanger sub-system.

9. A heat exchanger system comprising:
   (A) a triple-walled housing enclosing a plurality of three elongated concentric liquid passageways,
   (B) a first conduit means including:
      (1) one segment in communication with the first end of the outermost heat exchanger passageway,
      (2) a flow equalizing control valve in said conduit segment,
      (3) a second conduit segment in communication with the same end of the innermost heat exchanger passageway and connected to said first segment downstream from said valve, and
      (4) means for connecting said conduit to the liquid heating element of a solar collector,
   (C) a second conduit means including:
      (1) one segment in communication with the opposite end of the outermost heat exchanger passageway,
      (2) a flow equalizing control valve in said conduit segment,
      (3) a second conduit segment in communication with the same end of the innermost heat exchanger passageway and connected to said first segment upstream from said valve, and
      (4) means for connecting said conduit to the liquid heating element of a solar collector,
   (D) a pump in one of said conduit means,
   (E) a check valve in the same conduit means upstream from said pump,
   (F) a third conduit means in communication with the first end of the intermediate heat exchanger passageway and having means for connection to a source of cold water under pressure, and
   (G) a fourth conduit means in communication with the opposite end of the intermediate heat exchange passageway and having means for connection to a hot water storage tank.

10. A system according to claim 9 wherein said flow equalizing valves are throttling valves.

11. A system according to claim 10 wherein said pump and said associated check valve are in the second of said conduit means.

* * * * *

UNITED STATES PATENT AND TRADEMARK OFFICE
CERTIFICATE OF CORRECTION

PATENT NO. :   4,644,934

DATED      :   February 24, 1987

INVENTOR(S) :  David P. Kaus

It is certified that error appears in the above-identified patent and that said Letters Patent is hereby corrected as shown below:

Column 5, line 13, "tub" should be --tube--.

Column 6, line 17, "6" should be --5--.

Signed and Sealed this

Fifteenth Day of September, 1987

Attest:

DONALD J. QUIGG

*Attesting Officer*         *Commissioner of Patents and Trademarks*